Figure 2:
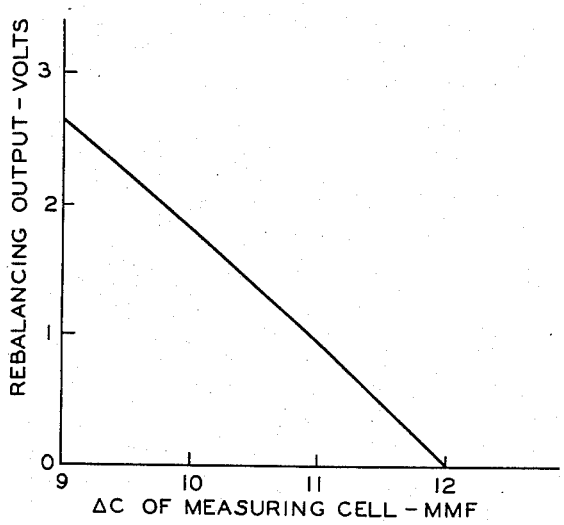

Dec. 24, 1963  D. A. FLUEGEL  3,115,603
CAPACITANCE MEASURING BRIDGE UTILIZING VOLTAGE SENSITIVE
CAPACITORS FOR REBALANCING THE BRIDGE
Filed Sept. 20, 1961  2 Sheets-Sheet 1

INVENTOR.
D.A. FLUEGEL
BY Hudson & Young
ATTORNEYS

United States Patent Office 3,115,603
Patented Dec. 24, 1963

3,115,603
CAPACITANCE MEASURING BRIDGE UTILIZING VOLTAGE-SENSITIVE CAPACITORS FOR REBALANCING THE BRIDGE
Dale A. Fluegel, Bartlesville, Okla., assignor to Phillips Petroleum Company, a corporation of Delaware
Filed Sept. 20, 1961, Ser. No. 139,414
11 Claims. (Cl. 324—60)

This invention relates to electrical measuring. In one aspect the invention relates to the detection and analysis of materials in terms of the dielectric constant thereof. In another aspect the invention relates to an improved apparatus and method for determining variations in capacitance. In yet another aspect the invention relates to a novel and improved capacitance bridge network. In still another aspect the invention relates to an improved method and apparatus for rebalancing a bridge network. In another aspect the invention relates to the utilization of voltage-sensitive capacitors in a capacitance bridge network.

The measurement of the dielectric properties of materials has become a valuable industrial and laboratory procedure for determining compositions. A detecting element in the form of an electrical condenser is disposed so that the material to be measured forms the dielectric. A measurement of the capacitance of the condenser thus provides information regarding the properties of the test material. This procedure can be employed to detect liquid levels, the moisture content of materials, the composition of materials, and the thickness of sheets of the materials, for example. The accuracy of the measurement depends to a large extent on the accuracy of the measurement of the capacitance of the resulting condenser.

The material to be measured forms the dielectric of a condenser which is connected in one arm of a bridge network. An alternating potential is applied across first opposite terminals of the bridge network. A reference signal from the same source is applied to the first input of a phase detector. The output signal from the bridge network is applied to the second input of the phase detector.

In accordance with the present invention improved method and apparatus are provided for detecting and analyzing materials in terms of the dielectric properties thereof. A capacitance bridge network is provided wherein a first arm contains a measuring cell capacitor, a second arm contains a reference cell capacitor, and each of the third and fourth arms contain a pair of voltage-sensitive capacitors, such as silicon or germanium capacitors, connected in series. The output of the phase detector is applied across the voltage sensitive capacitors as a rebalancing signal. The capacity of the voltage-sensitive capacitors is a function of the applied rebalancing signal. Thus, a change in capacity of the measuring cell capacitor results in a change in the D.C. signal level at the phase detector output, which is then applied across the voltage-sensitive capacitors. The rebalancing signals to the third and fourth arms are of opposite polarity causing an increase in capacity of the voltage-sensitive capacitors in one bridge arm and a decrease in capacity of the voltage-sensitive capacitors in the other bridge arm. This compensates for the inherent non-linearity of the voltage sensitive capacitors. The change in capacity of the voltage-sensitive capacitors returns the bridge network to a substantially balanced condition. Of course, the bridge network cannot be returned to an exactly balanced condition as at that point there would be no rebalancing signal to maintain the voltage-sensitive capacitors at their new capacity. However, the system of the present invention permits rebalancing of the bridge with increased speed and accuracy.

Accordingly, it is an object of the invention to provide an improved and simplified apparatus and method for measuring the capacitance of a condenser. Another object of the invention is to provide a bridge rebalancing network of increased accuracy and simplicity. Another object of the invention is to provide improved apparatus for detecting and analyzing materials in terms of the dielectric properties thereof.

Other objects, aspects and the several advantages of the invention will be apparent from a study of the disclosure, the drawing and the appended claims.

Figure 1:
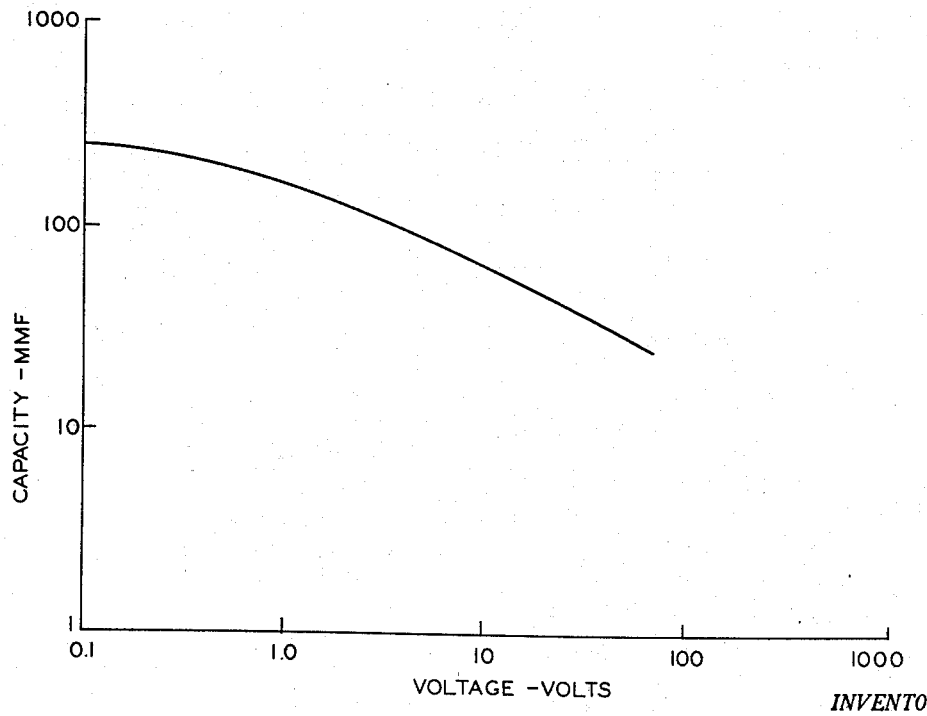
Figure 3:
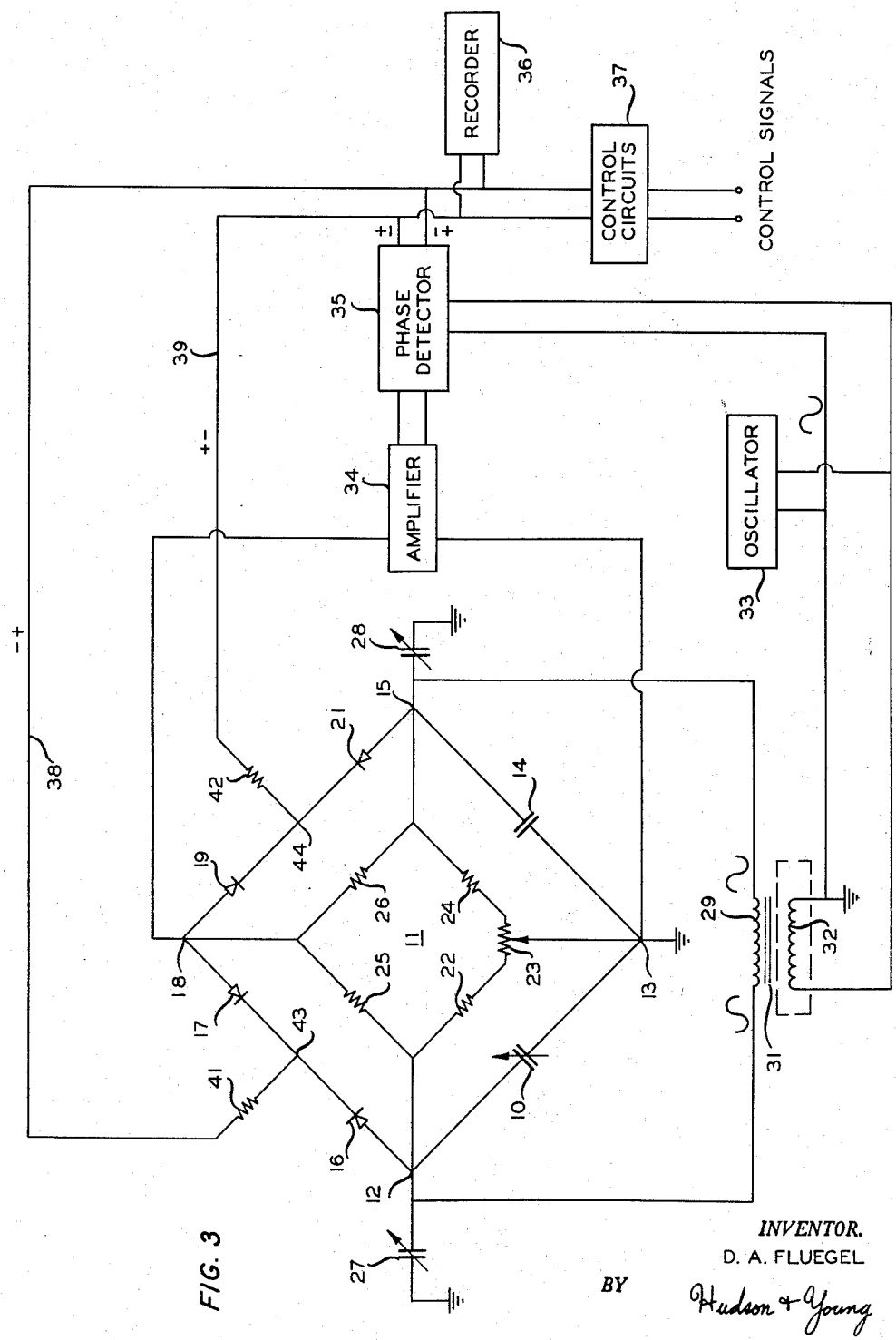

In the drawing, FIGURE 1 is a graph showing a typical voltage versus capacity curve for silicon capacitors. FIGURE 2 is a graph showing a typical rebalancing voltage output versus capacity change of the measuring cell. FIGURE 3 is a schematic representation of a rebalancing voltage-sensitive capacitor bridge network for capacitance measurement according to the invention.

Silicon capacitors, which are particularly suitable for use in the invention, are p-n junctions formed in single-crystal silicon by techniques used in the manufacture of semiconductor devices. At a p-n junction the density of charge carriers (electrons in the n region and holes in the p region) is reduced virtually to zero when a voltage is applied across the junction in the reverse direction from that causing easy current flow. As the voltage increases, the region of zero carrier density, known as the depletion region, gets wider. In effect this moves apart the two conducting areas and decreases the capacity as if there were two metal plates separated by a dielectric whose thickness was variable. The area of the plates remains the same; the dielectric constant is unchanged; but the thickness of the dielectric varies according to the applied voltage.

The junction can be biased at any desired value as low as zero volts (or even up to 0.4 volt in the opposite direction) regardless of the magnitude of the signal voltage. In the normal bias direction, the capacity will continue to decrease as the voltage is increased. Thus, as shown in FIGURE 1, the capacity of a typical silicon capacitor can decrease from a value of approximately 240 mmf. corresponding to an applied voltage 0.1 volt to a value of approximately 30 mmf. corresponding to an applied voltage of 50 volts. As the voltage in the normal bias direction is decreased the capacity will increase.

In FIGURE 3 there is shown a capacity 10 which comprises the detecting element employed to measure the dielectric properties of a test material. This capacitor can be of various configurations, depending upon the particular application of the instrument. If the thickness of a sheet of material is to be measured, the capacitor can be in the form of a pair of spaced plates having the test material therebetween. In detecting liquid levels, it is convenient to employ an elongated probe element which comprises an open cylinder having a second electrode disposed axially therein. Capacitor 10 can be a measuring cell suitable for use in a basic sediment and water monitor. Detecting element 10 obviously can be in the form of two or more spaced electrodes. Two specific examples of suitable measuring elements are described in U.S. Patent 2,904,751, J. R. Parsons, issued September 15, 1959.

Capacitor 10 is connected in a bridge network 11. The two terminals of capacitor 10 are connected to terminals 12 and 13 of bridge 11. A reference capacitor 14 is connected between terminals 13 and a third terminal 15. Silicon capacitors 16 and 17 are connected in series in back to back relationship between terminals 12 and a fourth terminal 18. Silicon capacitors 19 and 21 are connected in series in back to back relationship between terminals 18 and 15. Suitable silicon capacitors are HC 7005 manufactured by Hughes Aircraft Co., of Newport Beach, California. A resistance 22, a potentiometer 23 and a resistance 24 are connected in series between terminals 12 and 15, with the contactor of potentiometer 23 being connected to terminal 13 which in turn is connected to ground. Resistances 25 and 26 are connected in series between terminals 12 and 15 with the junction between resistances 25 and 26 being connected to terminal 18. Bridge terminals 12 and 15 are connected to ground through balancing capacitors 27 and 28, respectively. Bridge terminals 12 and 15 are also connected to the respective end terminals of the secondary winding 29 of a transformer 31. While transformer 31 can be of conventional construction, the transformer disclosed in my U.S. Patent 3,032,729 is preferred.

The primary winding 32 is energized from the output of an oscillator 33. Oscillator 33 can be a conventional type, such as one utilizing a transistor with suitable tuned circuits, and which is adapted to produce an A.C. signal having a suitable frequency, such as 40 kc.

Output terminals 13 and 18 of bridge network 11 are connected to the respective input terminals of high gain amplifier 34. The output terminals of amplifier 34 are connected to a first pair of input terminals of phase detector 35. While amplifier 34 and phase detector 35 can be of any suitable conventional design, the amplifier and phase detector disclosed in D. A. Fluegel and E. D. Tolin U.S. Patent 2,982,911, are preferred. The output of oscillator 33 is applied to a second pair of input terminals of phase detector 35. The output terminals of phase detector 35 can be connected to recorder 36 and/or control circuits 37 as desired. A portion of the output signal from phase detector 35 is transmitted through leads 38 and 39 and resistors 41 and 42 to the injunction 43 between silicon capacitors 16 and 17 and the junction 44 between silicon capacitors 19 and 21, respectively.

The operation of FIGURE 3 will now be described. The output of oscillator 33 is applied through transformer 31 across terminals 12 and 15 of bridge network 11. It should be obvious that this network forms a capacity bridge. If the bridge is balanced there is a zero potential difference between terminals 13 and 18. However, any unbalance of the bridge due to a change in capacitance of element 10 results in a potential at terminal 18 changing from ground potential. Any unbalance in the resistances 22, 23 and 24 or any change in the loss factor of the material in condenser 10 results in the potential at terminal 18 changing from ground potential. This latter potential is 90° out of phase with the potential due to a change in capacity of condenser 10. The unbalance signal at terminal 18 is applied to the input terminals of amplifier 34 wherein the unbalance signal is amplified. The amplified signal is applied to the first pair of input terminals of phase detector 35 while a reference signal from oscillator 33 is applied to a second pair of input terminals phase detector 35. Thus, the two signals applied to phase detector 35 are of the same frequency because they are both obtained from oscillator 33.

Phase detector 35 provides a D.C. output signal, the magnitude of which is determined by the amplitude and phase of the A.C. signal produced by bridge network 11. FIGURE 2 illustrates a typical relationship between a capacity change of the measuring cell 21 and the output of the phase detector 35. When bridge network 11 is balanced, the output of phase detector 35 can be set at zero or at some other value by a biasing arrangement. If the capacitance of capacitor 10 should become greater than that of capacitor 14, bridge network 11 is unbalanced in a first direction. If the capacitance of capacitor 10 becomes less than that of capacitor 14, the bridge network is unbalanced in the opposite direction. The phase of the output signal from the bridge thus changes by 180° when the direction of the unbalance changes. When the bridge output signal is in phase with the oscillator output, the D.C. output signal of phase detector 35 will be increased over its value for a balanced bridge condition; whereas if the bridge output signal is out of phase with the oscillator output, the D.C. output signal of phase detector will be decreased from its value for a balanced bridge condition.

A portion of the output signal from phase detector 35 is applied to junction 43 and 44 with the signal at junction 43 being the opposite polarity from the signal at junction 44 (or the signal applied to one junction being less positive than the signal applied to the other junction, depending on the value of the output signal of phase detector 35 at balanced bridge condition). This results in the capacity of the silicon capacitors in one arm being increased while the capacity of the silicon capacitors in the other arm is decreased. The change in capacity of silicon capacitors 16, 17, 19 and 21 in response to the D.C. rebalancing signal returns the bridge network to a substantially balanced condition.

Bridge network 11 is balanced initially by varying balancing capacitors 27 and 28 and potentiometer 23 until the recorder 36 reads zero or a predetermined value with a reference material disposed between the plates of capacitor 10.

As noted above, the drawing is merely a schematic representation and is not intended to fully show all component parts of the equipment which one skilled in the art will routinely design for the operation. Indeed, the showing of an element or piece of equipment does not mean that all such or similar pieces which may be or can be designed by one skilled in the art in possession of this disclosure cannot be utilized as substitution therefore; likewise, the omission of an element which one skilled in the art may include in an actual unit does not mean that such an element is intended to be omitted simply because it does not appear in the drawing. Thus, in some applications of the invention, it is desirable to compare the dielectric of a test material with that of a similar reference material, in which case capacitors 10 and 14 can be identical. In other applications capacitor 14 can be made adjustable to aid in initially balancing the bridge and/or to provide for programmed changes in the reference value. Various methods are available for initially balancing the bridge network. Suffice to say, the drawing is for illustrative purposes, as is the description thereof.

The means according to the invention for electronically rebalancing a bridge network results in several advantages over conventional means for rebalancing a bridge, such as the servo system which employs a servo-amplifier, a servo motor, and mechanical means for varying the value of a variable mechanical capacitor or resistor. A null balance system according to the invention results in simpler amplifier, oscillator, and phase detector circuits as the system accuracy is not affected by amplifier gain, oscillator amplitude, or phase detector linearity. Utilization of the silicon capacitors to rebalance the bridge network results directly in a voltage output at the phase detector rather than a mechanical rotation of a capacitor shaft which must be converted to an electrical signal via a retransmitting slidewire attached to the servo system.

Reasonable variation and modification are possible within the scope of the foregoing disclosure, the drawing, and the appended claims to the invention, the essence of which is the utilization of a rebalancing voltage to vary the capacity of voltage-sensitive capacitors connected in two arms of a capacitance bridge whereby the bridge network is returned to a substantially rebalanced condition.

I claim:
1. Electrical measuring apparatus comprising, in combination:
(1) a bridge network comprising first, second, third, and fourth bridge terminals, a measuring capacitor connected between said first and second bridge terminals, a reference capacitor connected between said second and third bridge terminals, first and second silicon capacitors connected in series in back to back relationship between said first and fourth bridge terminals, a first resistance connected in parallel with said first and second silicon capacitors between said first and fourth bridge terminals, third and fourth silicon capacitors connected in series in back to back relationship between said fourth and third bridge terminals, a second resistance connected in parallel with said third and fourth silicon capacitors between said fourth and third bridge terminals; a third resistance, a potentiometer, and a fourth resistance connected in series between said first and third bridge terminals, the contactor of said potentiometer being connected to said second bridge terminal which in turn is connected to ground; said first and third bridge terminals being connected to ground through first and second balancing capacitors, respectively;
(2) a voltage source comprising an oscillator, a transformer having a primary winding and a secondary winding, means for connecting said primary winding across the output terminals of said oscillator, means for connecting said secondary winding between said first and third bridge terminals;
(3) an output circuit comprising means for amplifying the voltage between said second and fourth bridge terminals, a phase detector, means for connecting the output terminals of said means for amplifying to the first input of said phase detector, means for connecting the output of said oscillator to the second input of said phase detector, and indicating means connected to the output terminals of said phase detector; and
(4) a rebalancing circuit comprising means for connecting one of said output terminals of said phase detector through a fifth resistor to a first junction between said first and second silicon capacitors, and means for connecting the other of said output terminals of said phase detector through a sixth resistor to a second junction between said third and fourth silicon capacitors; whereby the capacity of said first and second silicon capacitors is increased and the capacity of said third and fourth silicon capacitors is decreased upon a change in the output of said phase detector in a first direction whereas the capacity of said first and second silicon capacitors is decreased and the capacity of said third and fourth silicon capacitors is increased upon a change in the output of said phase detector in the opposite direction, thus maintaining said bridge network in a substantially balanced condition.

2. Electrical measuring apparatus comprising in combination:
(1) a bridge network comprising first, second, third, and fourth bridge terminals, a measuring capacitor connected between said first and second bridge terminals, a reference capacitor connected between said second and third bridge terminals, first and second voltage-sensitive capacitors connected in series in back to back relationship between said first and fourth bridge terminals, third and fourth voltage-sensitive capacitors connected in series in back to back relationship between said fourth and third bridge terminals;
(2) a voltage source comprising a source of A.C. voltage, and means for connecting said source of A.C. voltage across said first and third bridge terminals;
(3) an output circuit comprising means for amplifying the voltage between said second and fourth bridge terminals, a phase detector, means for applying the thus amplified voltage to said phase detector, means for connecting said phase detector to said source of A.C. voltage; and
(4) a rebalancing circuit comprising means for applying the output of said phase detector between a first junction between said first and second voltage-sensitive capacitors and a second junction between said third and fourth voltage-sensitive capacitors.

3. The apparatus according to claim 2 further comprising a first resistance connected in parallel with said first and second voltage-sensitive capacitors between said first and fourth bridge terminals, and a second resistance connected in parallel with said third and fourth voltage sensitive capacitors between said fourth and third bridge terminals.

4. The apparatus according to claim 3 further comprising a third resistance, a potentiometer and a fourth resistance connected in series between said first and third bridge terminals, the contactor of said potentiometer being connected to said second terminal.

5. The apparatus according to claim 2 wherein said source of A.C. voltage comprises an oscillator.

6. The apparatus according to claim 5 wherin said source of A.C. voltage further comprises a transformer, means for connecting the output of said oscillator across the primary winding of said transformer; and wherein said means for connecting said source of A.C. voltage across said first and third bridge terminals comprises means for connecting the secondary winding of said transformer across said first and third bridge terminals.

7. The apparatus according to claim 6 wherein said means for connecting said phase detector to said source of A.C. voltage comprises means for connecting said phase detector to the output of said oscillator.

8. The apparatus according to claim 2 wherein said means for applying the output of said phase detector between a first junction and a second junction comprises means connecting one of the output terminals of said phase detector through a resistor to said first junction, and means connecting the other of said output terminals of said phase detector through another resistor to said second junction.

9. The apparatus according to claim 2 further comprising indicating means connected to the output terminals of said phase detector.

10. Electrical measuring apparatus comprising in combination:
(1) a bridge network comprising first, second, third, and fourth bridge terminals, a measuring capacitor connected between said first and second bridge terminals, a reference capacitor connected between said second and third bridge terminals, first and second silicon capacitors connected in series in back to back relationship between said first and fourth bridge terminals, third and fourth silicon capacitors connected in series in back to back relationship between said fourth and third bridge terminals;
(2) a voltage source comprising a source of A.C. voltage, and means for connecting said source of A.C. voltage across said first and third bridge terminals;
(3) an output circuit comprising means for amplifying the voltage between said second and fourth bridge terminals, a phase detector, means for applying the thus amplified voltage to an input of said phase detector, means for connecting said phase detector to said source of A.C. voltage; and
(4) a rebalancing circuit comprising means for applying the output of said phase detector between a first junction between said first and second silicon capacitors and a second junction between said third and fourth silicon capacitors.

11. Apparatus comprising a capacitance measuring bridge having first and second input terminals, first and second voltage sensitive capacitors connected in series in back to back relationship in one arm of said bridge, third and fourth voltage sensitive capacitors connected in series in back to back relationship in a second arm of said bridge, a measuring capacitor connected in a third arm of said bridge, means for applying an A.C. voltage between said first and second input terminals, and means for applying a portion of the output of said bridge between a first junction and a second junction, said first junction being the junction between said first and second voltage sensitive capacitors, and said second junction being the junction being said third and fourth voltage sensitive capacitors.

References Cited in the file of this patent

UNITED STATES PATENTS 2,768,347  Hansen ---------------- Oct. 23, 1956